United States Patent [19]

Darian et al.

[11] Patent Number: 5,055,196
[45] Date of Patent: Oct. 8, 1991

[54] EXTRACTION PROCESS TO REMOVE PCBS FROM SOIL AND SLUDGE

[75] Inventors: Saeed T. Darian; Stephen P. Weinberg, both of Houston, Tex.

[73] Assignee: ENSR Corporation, Houston, Tex.

[21] Appl. No.: 289,219

[22] Filed: Dec. 22, 1988

[51] Int. Cl.[5] .......................................... B01D 11/02
[52] U.S. Cl. .................................. 210/638; 134/25.1; 134/26; 134/40; 208/262.1; 208/262.5; 210/639; 210/805; 210/806; 210/909
[58] Field of Search ............................ 134/7, 12, 25.1; 210/172, 195.1, 198.1, 200, 201, 202, 205, 206, 5.11, 634, 691, 699, 907, 908, 909; 585/469; 208/262.1, 262.5, 390, 391, 435

[56] References Cited

U.S. PATENT DOCUMENTS

| | | | |
|---|---|---|---|
| 4,336,136 | 6/1982 | Giguere | 210/195.1 |
| 4,374,735 | 2/1983 | Lindorfer et al. | 210/925 |
| 4,424,081 | 1/1984 | Giguere | 134/25.1 |
| 4,430,208 | 2/1984 | Pytlewski | 208/262.5 |
| 4,589,985 | 5/1986 | Yorke | 210/699 |
| 4,599,117 | 7/1986 | Luxemburg | 134/25.1 |
| 4,606,774 | 8/1986 | Morris | 134/12 |
| 4,610,729 | 9/1986 | Keane | 134/26 |
| 4,662,990 | 5/1987 | Bonanno | 210/195.1 |
| 4,726,905 | 2/1988 | Friedman et al. | 210/909 |
| 4,783,263 | 11/1988 | Trost et al. | 134/25.1 |
| 4,792,413 | 12/1988 | Nash et al. | 252/111 |
| 4,801,384 | 1/1989 | Steiner | 210/634 |
| 4,841,998 | 6/1989 | Bruya | 134/25.1 |
| 4,844,745 | 7/1989 | Nash et al. | 210/909 |
| 4,869,825 | 9/1989 | Steiner | 26/634 |
| 4,952,315 | 8/1990 | Saab | 134/25.1 |

FOREIGN PATENT DOCUMENTS

| | | | |
|---|---|---|---|
| 1145284 | 4/1983 | Canada | 208/391 |
| 2901927 | 7/1979 | Fed. Rep. of Germany | 134/40 |
| 0162454 | 9/1984 | Japan | 210/634 |
| 8602434 | 4/1986 | PCT Int'l Appl. | 134/12 |
| 1457608 | 12/1976 | United Kingdom | 210/634 |
| 1458633 | 12/1976 | United Kingdom | 210/634 |
| 2049466 | 12/1980 | United Kingdom | 210/634 |

OTHER PUBLICATIONS

Article by Sarbarethal, "Tarsands Extracts with Microemulsions and Emulsions", The Canadian Journal of Chemical Engineering, vol. 62, Apr. 1984.

John M. Moses, Ramin A. Brishamian; Use of Liquefied Gas Solvent Extraction in Hazardous Waste Site Closures; Aug. 1988; unpublished; Aiche 1988 Summer National Meeting, Denver, Colo., Aug. 21-24; paper #55D.

Ben M. Carpenter; PCB Sediment Decontamination-Technical/Economic Assessment of Selected Alternative Treatments, Dec. 1986; pp. 54-120; Hazardous Waste Engineering Research and Development, U.S. Environmental Protection Agency, Cincinnati, Ohio, 45268.

(List continued on next page.)

Primary Examiner—Robert A. Dawson
Assistant Examiner—Joseph Drodge
Attorney, Agent, or Firm—Felfe & Lynch

[57] ABSTRACT

This invention relates to a process for treating soil and sludge for removal of contaminants in contact with the soil or sludge. More particularly, this invention relates to a process where contaminants such as inorganic contaminants such as metal or metal salts or organic contaminants such as PCBs are removed from water-wet soil and sludge. In particular, this invention relates to a process for treating or cleaning a contaminated water-wet solid containing mixture by contacting the contaminated water-wet mixture with a solvent, the solvent containing a comminuting surfactant. The solvent used is a solvent for the contaminant and is sparingly soluble in water. The purpose of adding a comminuting surfactant to the solvent is to form a dispersed mixture of the solids, contaminants, and water whereby the contaminants are extractable into the solvent. The solvent containing the contaminants is easily separated from the solids and then the solvents and contaminants are separated and the solvent is reused. The solvent is preferably a hydrocarbon solvent containing a comminuting surfactant.

134 Claims, 1 Drawing Sheet

OTHER PUBLICATIONS

John S. Warner, Moira, C. Landes, Lawrence E. Slivon; Development of a Solvent Extraction Method for Determining Semivolatile Organic Compounds in Solid Wastes; 1983; pp. 203-213; Battelle Columbus Laboratories, Columbus, Ohio 43201.

Lanny D. Weimer; Basic Extractive Sludge Treatment (B.E.S.T. ®) Process; pp. RCC1-RCC19; Resources Conservation Co., 3630 Cornus Lane, Ellicott City, Md., 21043.

Feasibility Study Industrial Transformer Superfund Site Surficial Soil Contamination; Thomas Hoskings, P.E., PhD., Project Director, Riaz Ahmed, P.E., Program Manager, Karen M. Miller, Engineer; Jan. 1988, pp. 2-17-2-22; Radian Corporation, 10675 Richmond Ave., Suite 190, Houston, Tex. 77042.

EXTRACTION PROCESS TO REMOVE PCBS FROM SOIL AND SLUDGE

FIELD OF THE INVENTION

This invention relates to a process for treating soil and sludge for removal of contaminants in contact with the soil or sludge. More particularly, this invention relates to a process where contaminants such as inorganic contaminants such as metal or metal salts or organic contaminants such as PCBs are removed from water-wet soil and sludge. In particular, this invention relates to a process for treating or cleaning a contaminated water-wet solid containing mixture by contacting the contaminated water-wet mixture with a solvent, the solvent containing a comminuting surfactant. The solvent used is a solvent for the contaminant and is sparingly soluble in water. The purpose of adding a comminuting surfactant to the solvent is to form a dispersed mixture of the solids, contaminants, and water whereby the contaminants are extractable into the solvent. The solvent containing the contaminants is easily separated from the solids and then the solvent and contaminants are separated and the solvent is reused. The solvent is preferably a hydrocarbon solvent containing a comminuting surfactant.

BACKGROUND OF THE INVENTION

Polychlorinated biphenyls (PCBs) are widespread environmental contaminants. They are toxic organic chemicals. It has been found that PCBs tend to remain in the fatty tissues of an organism once entry has been gained and manufacture of PCBs has been banned in the United States. PCBs are a class of chemically inert, chlorinated hydrocarbons. PCB mixtures have had widespread commercial use as a result of their following favorable properties: high dielectric constant, high thermal and chemical stability, low vapor pressure, low water solubility, low flammability, and high miscibility with most organic solvents, polymers, and paints. Thus, they have been used primarily as, or additives to, dielectric, hydraulic, and heat transfer fluids. It is reported that over a billion pounds of PCBs have been manufactured in the United States, and it is estimated that 300 million pounds of these are in chemical landfills and about 750 million pounds are still in use. PCBs have been found in environmental and biological samples in many locations. They tend to accumulate in sediments, soil, and biota. The widespread distribution of PCBs has been attributed to their volatilization and atmospheric transport followed by wet or dry deposition. Although PCBs are suspected carcinogen, their acute toxicity is considered to be non-toxic to slightly toxic by the LD50 method. A more significant health impact has been linked to the incomplete combustion of PCBs which form polychlorinated dibenzodioxins (PCDDs) or polychlorinated dibenzofurans (PCDFs).

The problems associated with PCB contamination in New Bedford, Mass. (EPA Region I), the Hudson River in New York (EPA Region II), and in Waukegan, Ill. (EPA Region V) are highly publicized to be among the worst in the United States in terms of concentration and total quantity of PCBs.

The PCB contamination problems pose threats to both drinking water and the fishing industry. There are also many industrial lagoons contaminated with PCBs. At present, the only proven and effective technology to treat PCB-contaminated soil is excavation followed by incineration. However, incineration is very expensive and involves costly transportation. Disposal in a secure landfill is an option; however, it has legal restrictions and liability due to mobility of contaminants after landfilling. Permitting of landfills for hazardous materials disposal is becoming increasingly expensive and difficult. Biodegradation of PCBs is an option; however, these reactions are generally slow and not technically well proven.

PCB decontamination of PCB-contaminated liquids has been widely studied; however, little work has been done in the area of PCB-contaminated sediments and sludge. Often the soils contaminated with PCB's are in a clayey state such that before decontamination by any method is possible, the contaminated soil which is highly agglomerated requires extensive pretreatment. The pretreatment of the soil often required mechanical devices and additional time and labor which added to the expense due to the difficulties in handling the contaminated soils.

Rogers, et al describes in "Mobile KPEG Destruction Unit for PCBs, Dioxins, and Furans in Contaminated Waste," a paper presented at the 13th Annual Research Symposium on Land Hazardous Waste, Cincinnati, Ohio, May 6-8, 1987, a chemical process which reduces the toxicity of PCBs in soil by removing chlorine atoms in the presence of heat with an alkali metal polyethylene glycolate reagent (APEG; e.g., NaPEG or KPEG). The mechanism for the process is as follows: an alkali metal hydroxide such as potassium hydroxide is reacted with an alcohol such as polyethylene glycol having a molecular weight of about 400 to form an alkoxide. The alkoxide reacts with a chlorine atom from PCB to produce an alkali metal salt and an ether. Toxicity studies on the reaction products, such as the AMES test for mutagenicity and bioaccumulations, have produced negative results meaning that the products are not carcinogenic and do not accumulate in the food chain. The shortcoming of the chemical treatment using KPEG is that the process is water sensitive and requires large amounts of reagent, particularly on wet soil. The heat requirement to remove substantial amounts of water from soil will be tremendous.

Physical solidification with cement, lime, and fly ash is a technique designed to prevent PCBs from leaching from waste material. Solidification binds the waste material containing PCBs mechanically with cement, lime, and fly ash into a solid that does not readily release the contaminants upon exposure to air or water. Waste material is mixed with the solidification agents and poured into cubical compartments and allowed to cure. The solidified waste is then placed into a landfill.

Reynolds describes in "Unit Operations and Processes in Environmental Engineering," Wadsworth, Inc., Belmont, Calif., 1982, a biological process called activated sludge treatment. The treatment consists of a biological reactor containing microorganisms under aerobic conditions to oxidize organic contaminants to carbon dioxide, water, and microorganism cell mass. Kane and Metha have shown in their paper "Cleanup and Closure of a PCB Contaminated Pond" that the existence of PCB cogeners appear to enhance biodegradation reactions.

Sworzyn and Ackerman accomplish oxidation of sludge to alcohols, aldehydes, and acids using a process called catalyzed wet air oxidation as described in "Interim Guidelines for the Disposal/Destruction of PCBs and PCB Items by Non-Thermal Methods," EPA 68-02-3174, U.S. Environmental Protection Agency, Washington, D.C., 1981. In this process high temperatures (320° F. to 644° F.) and elevated pressures (451 psi to 2503 psi) are used to oxidize sludge to alcohols, aldehydes, and acids. At higher temperatures further oxidation of the organic compounds to carbon dioxide and water is reported. Reports also indicate that in the presence of oxygen in an acidic aqueous medium at high temperatures, PCBs can also be destroyed. The end products include carbon dioxide, nitrogen gas, water vapor, volatile organics, and inorganic solids.

In a different process called soil vitrification or glassification, electric current is used to melt the soil in place. An electric current is sent through electrodes placed in the ground to the desired depth. This causes the soil to heat up to 3600° F., which destroys the organic constituents in the soil including PCBs. Gases, including carbon dioxide and water vapor are collected and treated in a specially designed hood. As the crystalline material cools after treatment, it capsulates the inorganic soil components into a solid mass resembling natural obsidian. This process is described by Fitzpatrick, et al in their paper "In-Situ Vitrification—A Candidate Process for In-Situ Destruction of Hazardous Waste," presented at 7th Superfund Conference, Washington, D.C. 1986.

One of the most effective methods of disposal for PCB-contaminated soil is incineration. Incinerators usually have a primary combustion chamber which can handle solid wastes, pumpable liquid wastes, slurries, and sludge and a secondary combustion chamber which can handle only pumpable liquid or slurry wastes. The temperature at the combustion chamber varies from 2192° F. (1200° C.), with a 2-second detention time and 3% excess oxygen, to 2912° F. (1600° C.), with a 1.5-second detention time and 2% excess oxygen. Incinerators usually operate at greater than 99.9% efficiencies. Emission gases are generally monitored for oxygen, carbon monoxide, carbon dioxide, nitrogen oxides, hydrochloric acid, chlorinated organic compounds, PCBs, and particulate.

Possible incineration technologies include: liquid injection, fluidized bed, circulating bed, rotary kiln, electric infrared, electromelt, plasma arc, and Molten salt. Rotary kilns are the primary incineration technology available for treatment of wastes. Solid wastes are fed into one end of a rotating kiln and incinerated.

An EPA report entitled "PCB sediment Decontamination—Technical/Economic Assessment of Selected Alternative Treatments," PB87--133112, (EPA/600/2-86/112) describes the following summary of processes based on physical technologies (Section 5.2):

(a) Hancher, et al describes a soil-washing process which uses a kerosene-water mixture as a solvent to extract PCBs and other contaminated oil from soil. Kerosene solubilizes PCBs and oils, and water helps break up the soil particles. The mixture ratio that they found to give the most complete extraction of PCBs from contaminated soil was one part of soil to three parts of kerosene and three parts of water. They ran pilot plant experiments which showed 85% removal of PCBs from soil.

(b) Adams, et al showed that the rate of chemical destruction of PCBs in soil by APEG reagents could be enhanced by adding dimethyl sulfoxide (DMSO) or ethylene diamine to the hydroxide/PEG phase. The time required to reach less than 2 ppm PCBs in the product was shown to be reduced by an order of magnitude when DMSO was used.

(c) Weitzman reported that Freon-type solvents could be used in repeated washings of PCB-contaminated soil to remove PCB to less than 2 ppm. PCB loadings to 1983 ppm were leached in an agitated extractor. Soil types used were sand-clay mixtures and a dark loam.

(d) A process used by O. H. Materials uses methanol to extract PCBs from pre-dried contaminated soil. The soil is reduced to less than 25 ppm PCBs and land-farmed. Further reduction in PCB concentration could be achieved using more stages of extraction. The PCBs in the extract are concentrated by absorption on activated carbon, and the spent carbon is incinerated.

(e) Scholtz and Milanowski studied the extraction of PCBs from organic and inorganic soil using water that contained 1% Tween. The overall PCB removal was less than 50%. Results showed that the additive improved removal from inorganic soil, but appeared to inhibit removal from organic soil.

Warner et. al. studied extraction of waste matrices with methylene chloride under neutral conditions with anhydrous sodium sulfate to remove any water present. This extraction method was shown to be suitable for the extraction of phenols, anilines, and neutral compounds and is disclosed in "Hazardous and Industrial Solid Waste Testing", ASTM Special Technical Publication, #805, p. 203, 1983.

The Environmental Protection Agency (EPA) initiated a research program in early 1987 which studied soil washing for removal of contaminants such as organic, volatile, semi-volatile, and non-volatile compounds using water, water containing surfactant, and water containing chealating agents. Bench scale experiments were conducted in which the wash solution was mixed with the contaminated soil in a shaker and the mixture agitated at ambient temperature. The surfactant they used was "TIDE" (an anionic surfactant manufactured by Proctor and Gamble). The agitation was carried out for 30 minutes. The contaminated soil was comprised of different size fractions (e.g. clay, silt and sand). With soil particles smaller than 250 mm, the surfactant/water wash reduced semi-volatile organic compounds contained in the soil by 43.2 %. PCB's were not included in this study.

Moses, et. al. in a paper "Use of Liquified Gas Solvent Extraction in Hazardous Waste Site Closures" prepared for presentation at AIChE 1988 Summer National Meeting, Denver, Colo. August 21–24; Paper No. 55d, describes a proprietary, patented soil/sludge/wastewater extraction process which comprises using liquified gases and critical liquids as solvent to extract contaminants from waste streams. A critical fluid is a fluid which is at thermodynamically critical pressure and temperature, meaning that there is no distinction between a liquid or a gas under these conditions. The inventors claim that these fluids under critical conditions exhibit high solubilities for organic contaminants similar to their liquid counterparts. The advantage of using a fluid at its critical temperature and pressure is significant change in its kinetic behavior, such as high rates of diffusion and low viscosity, surface tension and density. Changing pressure and temperature generally changes the solubility of various contaminants in these fluids substantially. The process described by the inventors consists of an extraction column where the solvent is contacted countercurrently with the solids containing the contaminants. The solvent exiting the extraction column carrying the contaminants flows into a solvent recovery system where clean solvent is separated from the contaminants and is returned to the extraction column. The contaminants are properly disposed of. Classes of organic compounds extracted by the process are alcohols, aldehydes, aromatics, carboxylic acids, chlorinated hydrocarbons, esters, ethers, ketones, and nitriles.

Lanny D. Weimer describes a soil/sludge washing process called Basic Extractive Sludge Treatment. The process uses an aliphatic amine solvent such as triethylamine (TEA) to separate oily sludge into solid, contaminated-free water, and oil containing contaminants. The oil containing the contaminants is usually disposed of by incineration or chemical processes. Triethylamine has a property defined as inverse miscibility. This means that below 65° F. TEA is miscible with water, and above 65° F., TEA is immiscible with water. Therefore, simply heating a TEA/water/oil sample above 65° F. results in separation of water from oil. The process consists of a cold section and a hot section. In the cold section, the solvent is contacted with the contaminated oily sludge at 65° F., whereby, the contaminant, water, and oil all dissolve in the solvent. The solvent is then separated from the decontaminated soil or sludge. The solvent flows into the hot section of the process where it is heated to 135° F. at which point a phase separation occurs whereby water is separated from the oil containing the contaminants. The process may effectively separate oil and sludge, however, it is a complicated process. It requires refrigeration in the cold section of the process. It also introduces water into the contamination cycle from which the water then must be removed and decontaminated.

The processes described above all have shortcomings, not the least of which is the inability or inoperability to cope with an agglomerated or agglutinated PCB-contaminated waterwet soil. Incinerators are effective but the cost is enormously high. PCB landfilling is receiving more restrictions from the government. Chemical treatments are either water sensitive or consume too much reagents and are not yet technically proven.

Of the processes described above which may be considered to use solvents, there are two which have substantial shortcomings due to the presence of water with the mixture being cleaned or treated. The use of a solvent which is soluble in water such as methanol results in a liquid mixture where the contaminant, water and solvent are not easily separated. Furthermore, the solvent may not be easily recovered for reuse or a water effluent free of contaminants may not be easily obtained. The use of water as a solvent has the same shortcomings. When a surfactant is added to the water, the problems are increased since the surfactant acts to emulsify the contaminants so as to change a contaminant which is completely insoluble in water to a mixture containing the contaminant which is soluble to some degree in the water solvent. However, separating the contaminant and surfactant mixture from the water is very difficult, and especially obtaining a contaminant free water effluent.

The present invention overcomes the difficulties of these processes by using a solvent which is sparingly soluble in water providing an easy separation of the water and solvent and a comminuting surfactant which disperses agglomerated solid, contaminant mixtures which are wet with water and enables the easy separation of the solids from the contaminated mixture being cleaned or treated.

SUMMARY OF THE INVENTION

The present invention relates to a process and apparatus for communting a water-wet contaminated solid containing mixture, such as soil or sludge, which has a tendency to agglomerate or agglutinate, with a solvent for the contaminant by including a comminuting surfactant with the solvent. The water-wet contaminated solid containing mixture is cleaned by agitating with a solvent which is sparingly soluble in water and contains a comminuting surfactant. More specifically, the process and apparatus of the present invention are directed to cleaning or treating a water-wet contaminated solid containing mixture by agitation with a solvent which is sparingly soluble in water in the presence of a comminuting surfactant to enable the extraction of the contaminant into the solvent. The cleaning or treating which usually includes the extraction of the contaminants into the solvent is followed by separating the solvent containing the contaminants from the decontaminated solid and then recovering clean solvent from the contaminants. The clean solvent is reused in the process, This invention is particularly successful in removing contaminants in soils or sludge which could not be economically treated with any prior suggested technique because of the large quantity of water present, especially when the water is in large excess of saturation.

DESCRIPTION OF THE FIGURE

The sole Figure is a schematic flow sheet showing the method and apparatus of this invention as applied to decontaminating soil which is contaminated with a contaminant such as PCBs.

DETAILED DESCRIPTION OF THE PREFERRED EMBODIMENTS

Figure 1:
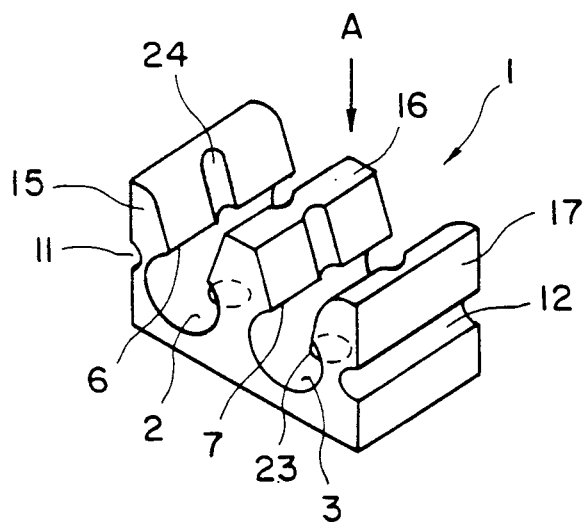
Figure 1A:
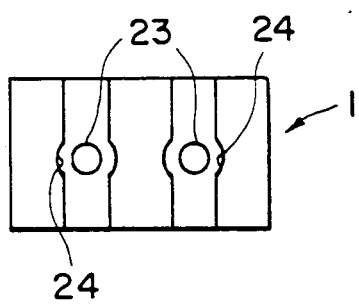
Figure 2:
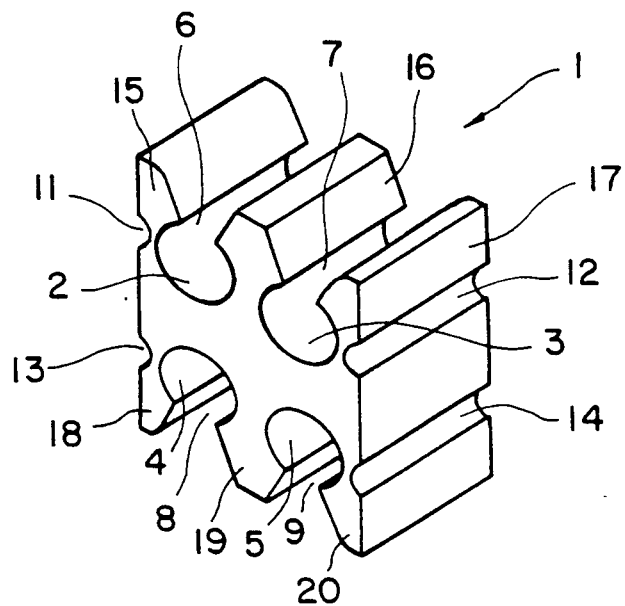

The real culprit to decontamination of a solid which is contaminated by a contaminant such as PCBs is the presence of water. Water, because of its high surface tension with the soil, usually surrounds the contaminants adhered to the soil particles and makes an impenetrable barrier which is not broken by ordinary extraction pocesses. If water were not present, the separation of the contaminant could be accomplished by a simple solvent extraction with a solvent in which the contaminants are soluble. However, when water is present, the choice of solvent presents two distinct separation problems which heretofore have prevented the use of solvent extraction to decontaminated solids such as soil or sludge.

First, if a hydrophilic (water-loving) solvent is used with a water-wet solid, such as soil, the solvent may have no physical effect on the solid and the solid may be easily separable from the liquids; however, the liquid mixture which comprises the contaminant, water and the solvent which is usually very soluble with the water is a very difficult mixture to separate cleanly, especially economically, into its component parts. To be economical, for example, the solvent must be easily recovered to be reused in the process.

On the other hand, if a hydrophobic (water-hating) solvent is used, the solvent may have the effect on the waterwet contaminated solid containing mixture of agglomerating or agglutinating the mixture. The agglomerating or agglutinating of the mixture with a hydrophobic solvent, which is due to the water, causes severe handling problems as well as preventing separation of the solids from the liquids including the contaminants or separation of the solvent from the contaminated solid and water mixture. Thus, if the soil or sludge becomes agglomerated or agglutinated, then the contaminants cannot be removed from the soil or sludge.

In order to better understand the present invention, certain of the terms as used herein will be defined.

A "water-wet" contaminated solid containing mixture is a contaminated mixture which contains an amount of water such that the use of a solvent alone causes agglomeration or agglutination of the solid and is insufficient to extract the contaminants from the solid. The presence of at least 1 wt.% of water will present the problems set forth hereinabove.

It is usual that the solid containing mixtures, such as soils and sludges, treated according to the present invention will have greater amounts of water than 1 wt. %, even exceeding saturation. As a practical matter, if the mixture is a soil for example, any amount of water in excess of saturation may be easily and naturally separated from the soil. The excess water will drip from the soil, physically run down a conveyor, or can be otherwise easily removed before being treated. On the other hand, the water component of a sludge, such as from the bottom of a lagoon, cannot be easily separated. However, where large amounts of water are present, the contaminated mixture may be pretreated such as centrifuged to remove the excess water. Although it may be economically advantageous to remove excess water prior to the treatment according of the present invention, it is not necessary to remove excess water prior to treating or cleaning the mixture according to the present invention.

The cleaning of soil contaminated with PCBs illustrates the method and apparatus of the present invention, as shown in FIG. 1. While PCBs are known as widespread environmental contaminants, the method and apparatus of the present invention is applicable to cleaning water-wet solid containing mixtures contaminated by a larger number of other contaminants. Other contaminants may include hydrocarbons illustrated by PCBs, benzene, and toluene; volatile organic compounds illustrated by acetone and chlorinated hydrocarbons such as trichloroethylene; non-volatile organic compounds illustrated by the poly-aromatic hydrocarbons such as anthracene; or the contaminating metals or metal salts illustrated by the water soluble metal salts such as lead sulfate or precipitated metal salts. In fact, the contaminants which can be cleaned by the process of the present invention are not limited to any class of compounds. Any contaminant which can be dissolved in a hydrophobic solvent containing comminuting surfactant can be removed from contaminated solids such as soil or sludge by the process of the present invention.

The contaminated solid containing mixtures which may be cleaned according to the present invention may be found in a wide spectrum of environmental situations. The solid containing mixtures may be essentially all solids, such as a soil where water is present in an amount of at least 1% by weight, or water may be the predominant component, such as an aqueous sludge where the solids make up only a small amount of the total (10-20 wt.% The solids cleaned are usually solids normal to the environment, such as soil, rock, wood, plants, and the like; generally, the organic and inorganic solids which are naturally found in the environment. Furthermore, solids such as materials not normal to the environment may be part of the solids cleaned. Pieces of metal, plastic, or glass are often part of the material or mixture found with the solids normal to the environment which are cleaned or treated by the admixing with the solvent and surfactant according to the present invention.

Soils are composed of different solid compound classifications, such as clay, silt, sand, or gravel or a mixture thereof. The process of the present invention is not limited to cleaning any one soil classification. Silt and clay comprise the smaller particle sizes in the soil (less than 2 mm), but contain more than 90% of the surface area of the soil. Sand and gravel are usually larger in particle size (greater than 2 mm), and contain a small fraction of total surface area of the soil (less than 10%). The contaminated soil can be organic or inorganic. The total organic carbon (TOC) of the soil can vary from less than 0.1% to higher than 10%

According to the present invention, it has been found that a solvent for the contaminants which is sparingly soluble in water in the presence of a comminuting surfactant neutralizes the effect of the water. When used to clean a contaminated water-wet solid containing mixture, such as soil or sludge, the solvent/surfactant comminutes the mixture whereby the solids become and remain dispersed, flowable, and discrete within the mixture. More importantly, in a comminuted mixture, the solvent can easily extract the contaminant from the contaminated mixture and the resultant liquid mixture is easily separable into its component parts of soil or sludge containing original water and solvent containing the contaminants.

A solvent for the contaminant is used in the process of the present invention and the solvent is sparingly soluble in water. The term "sparingly soluble" is defined in Hackh's Chemical Dictionary, third edition, under the definition of "soluble" on page 787. This degree of solubility, 30 to 100 parts solvent needed to dissolve one part of substance, is used to characterize the solvent under normal ambient conditions; however, this degree of solubility may increase under elevated temperatures and pressures. The characterization of the solvents used in the present invention are primarily hydrophobic solvents which are sparingly soluble in water.

The solvents which are preferred in the practice of the present invention are hydrocarbon solvents. The preferred solvents also have a density of less than 0.8 and a boiling point less than that of water. Solvents with low densities are preferred because low density enhances solid/solvent separation. A specifically preferred group of solvents are the lower ($C_1$ to $C_{10}$) aliphatic and cyclic saturated hydrocarbons. Specific solvents, especially for hydrocarbon contaminants such as PCBs, are namely, propane, butane, pentane, hexane, heptane, octane, nonane, cyclopentane, and cyclohexane. Other straight chain or branch chain aliphatic or aromatic solvents, such as benzene, may also be used in the process of the present invention. Hydrocarbons such as $C_1$ to $C_4$ which are gases in their natural state will be used under sufficient pressure to be in liquid form in the process of the present invention.

Most hydrocarbons are excellent solvents for PCBs, therefore, they will easily extract PCBs from the soil, particularly highly dispersed or comminuted soil particles. In addition to good solvation power of the solvent for contaminants, the solvent employed in the process of the present invention is preferred to be a low-boiling point material. The advantage of the low boiling solvents is the ease at which the solvent can be recovered from the PCBs, by distillation for example, for reuse of the solvent. The solvent/PCBs separation is greatly enhanced by the low-boiling point of the solvent, and with a preferred solvent greater of the solvent is recovered and reused. The than 98% of the solvent is recovered and reused. The remaining fraction of the solvent can be collected with the contaminant such as PCBs for the proper disposal of the contaminant/PCB fraction.

The amount of solvent used is usually between the amount needed for saturation of the solid containing mixture, such as a soil, and 500% by weight of the total weight of solid containing mixture being treated or cleaned.

Not only is the selection of solvent important, but according to the present invention, a comminuting surfactant is used. A "comminuting" surfactant is one which when included in the solvent essentially neutralizes the effect of the water in shielding the solid and contaminants from solvent contact and breaks down the water-wet contaminated solid containing mixture being treated. A solvent and a comminuting surfactant is easily quantifiable by shaking a water-wet contaminated solid containing mixture in a flask and observing the comminution of the solids in the mixture. It is the solvent/comminuting surfactant combination which treats the water-wet solid mixture to produce a comminuted mixture or a disperse, flowable, and discrete solid, such as soil or sludge particles, within the mixture and makes contaminant/PCB extraction from the solid feasible.

Certain surfactants in combination with solvents, when contacting a solid, such as soil or sludge particles, may cause swelling, clumping, and thickening of the mixture and are referred to herein as swelling surfactants. The physical mixture becomes similar to a water and clay mixture and is characterized as agglomerated or agglutinated. The mixture expands, clumps, thickens, and is sticky. Swelling is accompanied by absorption of the solvent into the solid/water/surfactant mixture, thereby preventing the recovery of the solvent. Experiments have indicated that the recovery of the solvent from the solid/water/swelling surfactant mixture varies from 0 to 20%. Experiments have also shown that the swelling phenomena is associated with surfactants which in water solution are near basic or basic (pH 7–9). The swelling phenomena can be partially or completely reversed by adding acid to the mixture containing these surfactants. The quantity of a surfactant will depend on the solid, solvent water content and the surfactant type. The extent of comminution which results by adding acid to a swelling mixture will also depend on the quantity of acid added.

A "comminuting" surfactant is used to mean that when the surfactant contacts the contaminated solid containing mixture, the solids in the mixture are broken down into smaller particles such that at least 40% of the solvent is recoverable in the extraction or in the phase separation of the component parts into the solid containing original water and the solvent containing the contaminants. More preferred comminuting surfactants result in a recovery of at least 70% solvent and the most preferred surfactant result in at least 85% recovery of solvent.

The surfactants suitable for the present process are characterized as comminuting; however, the preferred surfactants also have sufficient water solubility to enable extraction of contaminants from the solid into the solvent. The surfactant therefore must have some water solubility or, may be, completely water soluble to provide a bridge between solid particles and the solvent whereby the contaminant/PCBs is extracted through the water barrier which surrounds the contaminant/PCBs attached to or contaminating the solid. It is perceived that the solid such as in the treatment of soil or a sludge will have the contaminant, such as PCBs, adhered to its surface. The presence of water, therefore, is a virtual encapsulation of the contaminant as it adheres to the solid/soil surface. Hence, it is necessary to provide a bridge across this water barrier so that the extraction of the PCBs or other contaminants adhering to the solid/soil can take place. It is this characterization of the surfactant and its water solubility which results in an "extractive" surfactant. The preferred comminuting and extractive surfactants are acidic in a 2 wt.% water solution. Preferrably the pH will range between 1 and 6 and more preferrably less than 5.5.

A surfactant by definition is a substance which alters the surface tension of water, and there are traditionally three types: nonionic, anionic, and cationic. A fourth type which under certain conditions may be anionic or cationic is known as amphoteric. The nature of a surfactant is to have one end of the molecule which is hydrophilic and the other hydrophobic.

The surfactant is generally incorporated into the solvent for the treatment of the water-wet solid containing mixture. The amounts of surfactant may be between 0.05 and 20 wt.% of the water-wet solid containing mixture such as soil or sludge being contacted. More preferably the amount of surfactant is between 0.1 and 15 wt.%, and the most preferred amounts are between 0.5 and 8 wt.% of the water-wet solid containing mixture being contacted. Thus, when a ton of solid containing mixture or contaminated material is treated (i.e., the solid containing mixture, such as soil or sludge including the contaminant and water) the amount of surfactant which is utilized is based on the weight of mixture being cleaned or treated, or 1 to 400 pounds per standard ton. Although incorporating the surfactant into the solvent is one embodiment of the process of the present invention, in a different embodiment, especially when the solid containing mixture contains water in excess of saturation (e.g. an aqueous sludge), the surfactant can be added to the water phase in the solid containing mixture. Since water is the component which forms a barrier that surrounds soil particles preventing the transfer of contaminants from solid into the solvent, the amount of water present will affect the ease with which this barrier can be broken and the surfactant added to this mixture will be indicated by the amount of water present in the solid containing mixture.

According to the present invention, testing has identified comminuting surfactants which are in each of the traditional classes: anionic, nonionic, and cationic. Specific examples of comminuting surfactants which may be used in the process of the present invention are set forth. Moreover, from the disclosure of specific examples from each type or class of surfactants, and the examples which follow, only simple experimentation is necessary to arrive at other suitable surfactants which may be used in the process of the present invention.

Nonionic Surfactants

Specific examples of comminuting nonionic surfactants are compounds which are formed by reacting octyl- or nonylphenols with ethylene oxide. The average number of ethylene oxide molecules attached to each molecule of nonyl- or octylphenol is between 1 and 6 ethylene oxide molecules per molecule octyl- or nonylphenol. The hydrophilic-lyophilic balance, HLB (water loving-hydrocarbon loving, respectively), increases as the number of ethylene oxide molecules increase. When the ethylene oxide molecules are between 1 and 4, the surfactant is immiscible in water, whereas if the average number of ethylene oxide molecules attached is between 4 and 6, the surfactant is dispersible in water.

The preferred non-ionic surfactants of those above are much more soluble in the solvent than the water. Suitable non-ionic surfactants have an HLB between 4 and 10. The preferred nonionic surfactants have an HLB between 7 and 10. These nonionic surfactants are most effective when used at concentrations of about 0.5 wt.% to about 8 wt.% and preferably about 1.0 wt.% to about 6 wt.%, based on the soil being treated. Greater amounts could be used without visible improvement.

Other nonionic surfactants may include adducts of fatty acids, amines or other substances and their derivatives with ethylene oxide or adducts of ethylene oxide with phenolic compounds having a side chain.

The amount used can depend on the condition of the soil; i.e., the amount of water present and the degree of compaction. Generally, the greater the amount of water or compaction, the more surfactant is used.

Cationic Surfactants

Specific comminuting cationic surfactants are liquids formed from the quaternary ammonium chloride derivatives of polypropoxy tertiary amines. The preferred cationic surfactants of this general formula are those with an acidity of less than a pH of 5.5. Such a cationic surfactant would have at least a molecular weight of 1200 and preferably between 1600 and 2500.

The general formula for these compounds can be represented as follows:

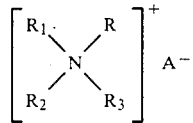

where,
R is a C1 or C2 alkyl, preferrably a methyl radical;
$R_1$ and $R_3$ are each a C1 to C4 lower alkyl, preferrably an ethyl radical;
$R_2$ is a polyoxypropylene radical having an average molecular weight of from about 400 to about 2000; and
A is a halogen, preferrably chlorine.

The molecular weight of these surfactants depends on the $R_2$ radical. Molecular weights of these compounds are generally between 600 and 2500. Water solubility decreases as the molecular weight of the molecule increases.

The preferred cationic surfactants of this general formula are those with an acidity of less than a pH of 5.5. Such a cationic surfactant would have a molecular weight of at least about 1200 and preferably between 1600 and 2500.

Other cationic surfactants may include aliphatic (fatty) amines and their derivatives, homologues of aromatic amines having fatty acid constituents, fatty amides derived from disubstituted amines, quaternary ammonium compounds, amides derived from amino alcohols and their quaternary ammonium derivatives, quaternary ammonium bases derived from fatty amides of disubstituted diamines, basic compounds of sulfonium, phosphonium, and antimonium, dimethylphenylbenzl ammonium chloride, urethanes or basic salts of ethylene diamine, polyethylene diamines and their quaternary ammonium derivatives, polypropanol polyethanolamines and various cationic-active compounds.

Anionic Surfactants

A specific example of an anionic comminuting surfactant is octylphenoxypolyethoxyethylphosphate a material sold by Rohm and Hass Company under the trademark "TRITON QS-44". This anionic surfactant may be in a free acid form or as an alkali metal salt, preferrably the sodium salt.

Effective anionic surfactants are those having a pH less than 7, preferably less than 5. The active ingredient in other comminuting anionic surfactants which may be used in the present invention is sodium dioctylsulfosuccinate.

Other anionic surfactants may include products obtained by direct sulfonation of fatty acids without previous treatment, products obtained by esterification of fatty acids with sulfonated monovalent alcohols, sulfonated derivatives of fatty acid esters of low molecular weight, sulfonated products of fatty amides, products obtained by condensation of fatty acid chlorides with amines, sulfonation products of fatty acid nitriles or aldehydes of ketones or other natural or synthetic alcohols, products obtained by use of mineral esterification agents other than sulfuric acid and sulfonated aromatic compounds.

While specific suitable comminuting nonionic, cationic,, and anionic surfactants have been set forth, the surfactants which may be used in the present invention are not limited to these specifically discussed. The foregoing illustrate that slightly water soluble, or soluble surface active agents or surfactants usually, with a pH less than 5.5 are preferred according to the present invention.

The cleaning or treating of water-wet solid containing mixture with the solvent/surfactant of the present invention is preferably carried out in an agitation tank or vessel. The agitation is provided by an agitator such as, for example, a mixer, driven by a motor to provide thorough contact of the solid containing mixture with the solvent/surfactant. Since the contaminated solids can be such a wide range of materials to be handled, various systems for delivering the solid containing mixture to the agitation tank may be used. These can vary from apparatus such as bull dozers in handling contaminated mixtures which are almost all solids, such as soil, to a pump and line for handling an aqueous slurry containing very little solids. In the contacting of the water-wet solid containing mixture with the solvent and surfactant mixture, the treated materials become a dispersed mixture in the solvent.

In practice, solids which have large particle sizes, such as rocks, pieces of wood, or non- environmental solids, are preferably removed by means of a screen or other means for separating the larger sized materials before being placed in the agitation tank and are later decontaminated. In the treatment of environmental solids, such as clay materials which may be removed by a bull dozer in very large chunks, these materials can be placed in the agitation tank and the mixing with the solvent and surfactant of the present invention will result in a comminuted mixture; i.e., a dispersed and broken down particle of soil in the mixture. After the thorough mixing, a phase separation may be accomplished so as to separate the solid, such as soils, from the liquid solvent which now contains the contaminant.

For an economical process, it is preferred to separate the solvent from the contaminant which is part of the liquid mixture. Distillation is one manner of separating the solvent and surfactant from the contaminant, but chemical or electrochemical methods may be also used. The separation of the solvent may also be accomplished by physical processes such as precipitation, membrane processess or ion exchange for reuse.

In the process of the present invention, contaminated soil or sludge is contacted with a hydrophobic solvent which contains a comminuting surfactant to remove contaminants from the said soil or sludge. The solvent containing the surfactant is mixed with the soil or sludge in an agitation tank and the mixture is agitated so that the surfactant diffuses through the solid particles, thereby breaking the solid particles into their smallest particle size.

Surfactants are surface active agents which reduce the surface tension of water which has a tendency to agglomerate or agglutinate the solid particles. Laboratory experiments in the process of the present invention have indicated that temperature is an important factor in improving the extraction efficiency of contaminants from the soil or sludge. The effect of temperature in improving the extraction efficiency in the process of the present invention is two fold. First, an increase in temperature increases the desorption rate of the contaminants which are adhered to solid surfaces thereby releasing the contaminants into the solvent phase. Second, an increase in temperature helps reduce the surface tension of water or the interfacial tension between the water contained in the solid mixture and the solvent used in the process of the present invention. Both these factors enhance the extraction efficiency of the contaminants from solid surfaces.

Experiments have indicated that the temperature range at which the process of the present invention can be operated is dictated by the boiling point of the solvent used for the extraction of the contaminants. Generally, effort is made not to exceed the boiling point of the solvent preferred by the process of the present invention. However, in a more preferred embodiment of the process of the present invention, higher extraction temperatures are achieved by operating the extraction section of the process under elevated pressures. Increasing the pressure on a liquid generally increases its boiling point.

The process of the present invention can be operated at temperatures ranging from 0°-250° C., more preferably from 30°-150° C., and most preferably from 50°-100° C.

In the process of the present invention, contaminated solid, such as soil or sludge, is treated and cleaned from said contaminants by bringing the said solid into contact with a hydrophobic solvent which contains a comminuting surfactant. The mixture is agitated in the presence of the comminuting surfactant to break the solid particles which are generally agglomeratated or agglutinated.

The mixing mechanism and the time of the mixing are both important parameters which affect the performance of the process of the present invention. Various mixing techniques can be employed in the process of the present invention. These may include, but are not limited to, attrition mixing, high RPM propeller mixing, and high shear mixing.

The objective of mixing is to use a comminuting surfactant to break down the solid particle mixture which has been encapsulated by water and reduce the solids to their smallest particle size. The surfactant needs to diffuse into the encapsulated solid particles which are agglomerated because of high surface tension of the water. High agitation increases the diffusion rate of the surfactant into the water encapsulated solid particles and helps reduce surface tension of water, thereby breaking solid particles into small particles.

The time required to achieve sufficient mixing wil depend on the type of mixing mechanism used. Experiments in the laboratory with electric stirrers and vortex mixers have indicated that mixing time in the range of 0.5–30 minutes, more preferably in the range of 2–10 minutes are preferred.

In the process of the present invention, the extraction of contaminants from solid, such as soil or sludge, using a hydrophobic solvent in the presence of a comminuting surfactant to break down the agglomerated or agglutinated solid particles, can be carried out in batch or continuous mode.

In the batch mode of operation, the solvent containing the comminuting surfactant is brought into contact with the contaminated solid such as soil or sludge in a mixer/settler tank. The mixture is agitated for a specific time during which the contaminants are transferred from the solid phase into the liquid phase. After the equilibrium is reached, the agitation is stopped and the mixture is separated into solid and liquid phases. The separation of solid from liquid can be accomplished by various methods such as gravity settling, centrifugation, hydroclone settling, or a combination thereof.

After sufficient settling between solid and liquid is accomplished, the liquid phase containing the contaminants is separated and directed into a liquid separation device, such as, for example, a distillation column or any other separation mechanism where the solvent is purified for reuse in the extraction process. For higher extraction efficiency for the contaminants, fresh solvent is brought into contact with partially cleaned solid in the extraction tank and the above procedure is repeated. The advantage of the batch operation is high efficiency of contaminant removal in each stage of extraction. The disadvantage of batch operation, however, is large amount of solvent use in consecutive stages.

The process of the present invention can also be practiced in a continuous mode in which solvent and contaminated soil are contacted with each other continuously during which time contaminants are continuously transferred from the solid phase into the liquid phase. More specifically, in a countercurrent extraction unit the solid and liquid travel continuously and countercurrently. As the solid phase travels through the extraction unit it becomes more decontaminated while the solvent becomes more contaminated. The advantage of continuous countercurrent operation is significant reduction in the volume of solvent used and simplicity in operation. However, the disadvantage of continuous operation is the need for long extraction columns.

The amount of surfactant which is added to the solvent in the process of the present invention is also dictated by the mode of operation, batch vs. continuous. The surfactants preferred in the process of the present invention may be soluble in water, solvent or mutually soluble in water and solvent.

In a batch mode of operation the surfactant is added to the batch extraction tank in the first stage. If the surfactant is only soluble in the solvent, it will leave the system with the solvent when the solvent is separated from the solid at the end of the first stage. More surfactant must be added to the mixture in the second stage to keep the solid particles dispersed. The same is true for the following stages. If a water soluble surfactant is used, upon separtion of the solvent from the solid at the completion of the first stage, the surfactant will stay with the water in the solid phase, therefore, no additional surfactant need be added to the solid/solvent mixture in the subsequent stages. Finally, if a surfactant which is mutually soluble in the solvent and water is used in the extraction process, the amount of surfactant which is added to the extraction in the consecutive stages is equivalent to the surfactant which was soluble in the solvent during the previous stage.

In the continuous mode of operation, if a solvent soluble surfactant is used, experiments must be conducted to determine the continuous rate of surfactant removal by the solvent and surfactant must be added continuously to the system to maintain a constant concentration of surfactant in the mixture. However, if water soluble surfactant is used no further addition of surfactant may be necessary.

In the process of the present invention extraction is used to remove contaminants such as PCB's from solid such as soil or sludge using a solvent containing a comminuting surfactant to break down the agglomerated or agglutinated solid particles. The surfactant used in the process of the present invention may be completely or partially soluble in water or the solvent used. If the surfactant is water soluble, it will be contained in the decontaminated soil when the said soil is returned to the environment. However, if the surfactant is only soluble in the solvent, it will be carried out of the extraction process by the contaminated solvent. The surfactant will finally end up in the waste which is collected from the bottom of the distillation column and will be eventually disposed of.

Some surfactants, if used in large concentration in the soil, may be considered health hazards, and therefore must be removed from the soil prior to returning the soil to the environment. The present invention describes a process which uses comminuting surfactants which are either non-hazardous or, if hazardous, are biodegradable. Experiments have indicated that the preferred surfactants employed in the process of the present invention under desirable biological conditions are degraded to non-toxic components.

Table 1 was constructed by running physical characteristics tests on a number of surfactants which have been used in the process of the present invention. Column 1 gives the trade name for the particular surfactant tested. In column 2 the surfactant is classified as either nonionic, cationic, or anionic. Column 3 and 5 describe water solubility and pH of the surfactant, respectively. To measure these properties, a 2 wt% solution (unless otherwise specified) of the surfactant in the water was prepared. The surfactant is classified as soluble, partially soluble, dispersible, partly dispersible, or insoluble.

The cationic surfactants tested were all liquid-form quaternary ammonium chloride derivatives of polypropoxy tertiary amines having the preferred formula as set forth hereinabove under cationic comminuting surfactants. Each are a light amber oily liquid having a specific gravity of about 1.01 and each surfactant differs in the length of the polyoxypropylene radical so that they have different average molecular weights. Each is sold by Witco Chemical under the trademark "EMCOL". The quaternary ammonium chloride derivative having an approximate molecular weight of 600 has the trademark "EMCOL CC-9"; the one having an approximate molecular weight of 1600 has the trademark "EMCOL CC-36"; and the one having an approximate molecular weight of 2500 and which is biodegradable has the trademark "EMCOL CC-42".

The anionic surfactants which were found to be comminuting were octylphenoxypolyethoxyethylphosphate anionic surfactant, which had an amber color and a viscosity of about 8000 centipoise at 25° C. sold by Rohm and Haas under the trademark "TRITON QS-44[" and a surfactant supplied as a 60% solution in a mixture of equal parts of isopropyl alcohol and water wherein the active ingredient is sodium dioctylsulfosuccinate sold by Rohm and Haas under the trademark "TRITON GR-5M".

The nonionic surfactants tested were reaction products of octylphenol or nonylphenol with ethylene oxide. The octylphenol or nonylphenol with ethylene oxide. The octylphenol product has the following general structural formula:

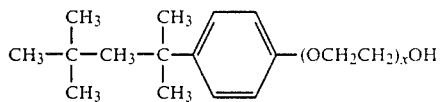

The surfactants differ in the length of the polyoxyethylene chain. The product wherein x=1 is sold by Rohm and Haas under the trademark "TRITON X-15", the surfactant where x is 3 is sold under the trademark "TRITON X-35", and the surfactant where x is equal to 5 is sold under the trademark "TRITON X-45". Another nonionic surfactant is the reaction product with nonylphenol having the following general structural formula:

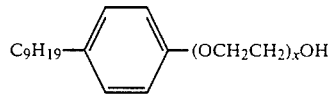

in which the C9 alkyl group is a mixture of branched-chained isomers and x indicates the average number of ethylene oxide units in the ether side chain.

A product wherein x is equal to 6 is sold by Rohm and Haas under the trademark "TRITON N-60".

Nonionic surfactants of polyethoxylated nonylphenols with average ethylene oxide contents of 4-12 moles per mole of nonylphenol are offered and sold by Henkel Corporation. A product wherein the moles of ethylene oxide are four is sold under the trademark "HYONIC NP-40" and and another having six moles of ethylene oxide has the trademark "HYONIC NP-60".

The preferred surfactants in the process of the present invention must be comminuting surfactants, meaning that when mixed with solid/solvent mixture, they will break down water encapsulated solid particles to smaller sizes so that the contaminants can be removed from the solid easily. A noncomminuting or a swelling surfactant is a surfactant that when mixed with the solid/solvent mixture will cause the solid mixture to swell or thicken to a point where all or part of the solvent will be absorbed by the solid mixture. When swelling occurs, no contaminant can be removed from the solid phase. Column 4 in Table 1 shows the comminuting characteristics of the preferred surfactants.

Two anionic sodium alkyl arylpolyether sulfonate surfactants sold by Rohm and Haas under the trademark "TRITON X-301" and "TRITON X-200" were not comminuting surfactants. The characteristics of these surfactants are set forth in Table 2. As is set forth in the table, a noncomminuting surfactant has no ability to extract the contaminant from the soil containing mixture into the solvent.

The extractive efficiency of the surfactants in the process of the present invention is defined with respect to two criteria: first, the amount of surfactant necessary to achieve a certain level of contaminant removal; and second, the overall efficiency of the extraction process. Column 6 rates the extraction efficiency of the comminuting and noncomminuting surfactants which were studied in the process of the present invention. The rating "excellent" means that the surfactant was used in a very small quantity and the extraction efficiency was very high. The rating "none" means that the surfactant had no extractive ability.

TABLE 1
PHYSICAL CHACTERISTICS OF SURFACTANTS

| Trade Name | Surfactant Type | Solubility in Water | Comminuiting | pH of 2% Solution | Extraction Efficiency |
|---|---|---|---|---|---|
| Emcol CC-9 | Cationic | S | Yes | 6 | F |
| Emcol CC-36 | Cationic | Pt. S | Yes | 4.5 | G |
| Emcol CC-42 | Cationic | Pt. S | Yes | 4 | V G |
| Triton QS-44 | Anionic | S | Yes | 2 | E |
| Triton GR-5M | Anionic | S | Yes | 5 | V G |
| Triton X-15 | Nonionic | D | Yes | 5 | F |
| Triton X-35 | Nonionic | Pt. D | Yes | 4.5 | G |
| Triton X-45 | Nonionic | D | Yes | 6 | G |
| Triton N-60 | Nonionic | D | Yes | 6 | P |
| Hyonic NP-40 | Nonionic | I | Yes | 7* | F |
| Hyonic NP-60 | Nonionic | D | Yes | 7* | P |

*pH in 1% solution.
S = Soluble  I = Insoluble  Pt. S = Partly Soluble  D = Dispersible  Pt. D = Partly Dispersible  P = Poor, F = Fair, G = Good, V G = Very Good, E = Excellent

TABLE 2
PHYSICAL CHARACTERISTICS OF SURFACTANTS

| Trade Name | Surfactant Type | Solubility in Water | Comminuiting | pH of 2% Solution | Extraction Efficiency |
|---|---|---|---|---|---|
| Triton X-301 | Anionic | S | No | 8** | None |
| Triton X-200 | Anionic | S | No | 8** | None |

**pH in 5% solution.
S = Soluble  I = Insoluble  Pt. S = Partly Soluble  D = Dispersible  Pt. D = Partly Dispersible  P = Poor, F = Fair, G = Good, V G = Very Good, E = Excellent Referring now to FIG. 1, the present invention is illustrated by cleaning soil contaminated with PCBs and the apparatus used to carry out the cleaning operation. The wet contaminated soil containing water, which may contain in excess of the saturation level, is transferred from a contaminated soil pile 1 onto a conveyor belt 2. As the soil moves up, the excess water is drained and collected in a sealed container 3. The contaminated soil is then transferred into the screening and classification system 4 where greater than ½-inch particles are removed from the contaminated soil using a vibrating screen. The contaminated soil travels into the agitation tank 5 which is equipped with a drive motor 6. Clean solvent line 7 flowing from the clean solvent holding tank 21 also enters the agitation tank 5. Surfactant line 8 brings surfactant from surfactant holding tank 23.

Contents of the agitation tank 5 are mixed vigorously for a specified period of time using the agitation drive motor 6. After thorough mixing, the slurry from tank 5 is directed through line 9 into the settling tank 10. Sufficient time is allowed in the settling tank 10 for the liquid and solid to phase separate. This mixing and settling operation represents only a single batch extraction stage. More than one extraction stage may be accomplished by repeating these operations in the same or multiple pieces of equipment or may be carried out in continuous countercurrent process equipment. After phase separation, the solvent containing the PCBs is directed through line 16 into a liquid separation or distillation column 18 where clean solvent is recovered through stream 19. Clean solvent vapor 19 is then condensed in the condenser 20 and stored in the clean solvent holding tank 21. The residual solvent is collected from the re-boiler of the distillation column 18 through line 22, and is properly disposed of.

Decontaminated soil containing solvent from the settling tank 10 flows through line 11 into the dryer 12 which is heated using hot oil that enters the dryer through line 13 and exits through line 14. As the soil travels the length of the dryer 12, the solvent contained in the soil is vaporized and the vapor passes through line 17 and is condensed in the condenser 20 and stored in the clean solvent holding tank 21. The solvent-free, decontaminated soil leaves the dryer through line 15 and preferably, is later returned to its original location.

The foregoing reference to the drawing is directed to a specific example of a contaminated solid which is cleaned by the present invention. It is understood that modification o use of other specific equipment is well within the scope of the present invention.

The present invention is further illustrated by the following specific examples. These examples illustrate the unique advantages of the solvent/surfactant interaction of the present invention.

EXAMPLE I

A 60-gram PCB-contaminated soil sample containing about 30 wt% water was placed in a 2000 ml three-neck glass flask equipped with a stirrer. About 0.6 gram (one wt%) of a phosphate ester anionic surfactant, octylphenoxypolyethoxyethylphosphate sold by Rohm and Haas under the trademark "TRITON QS-44", was added to the wet soil. Cyclohexane in the amount of 120 grams was added to the glass container. The vessel was sealed from the atmosphere and placed in a heating mantle for temperature control. The temperature in the vessel was measured using a thermometer attached through one neck. A laboratory stirrer was used to provide variable speed agitation to the contents of the vessel. A water-cooled condenser was connected to the vessel through another neck on the top of the flask to condense any vapor which was generated during the heating and agitation of the contents of the vessel.

The contents of the vessel were stirred vigorously for five minutes while maintaining a temperature of 80° C. in the extraction mixture. At the end of the mixing period, the soil was finely dispersed in the cyclohexane phase. The heat source was removed and the contents of the vessel were allowed to settle. After 5 minutes of settling the cyclohexane phase carrying the PCBs was decanted from the solid phase. A sample of the liquid was obtained to measure PCB removal in the first stage of extraction.

The extraction procedure was repeated by adding 120 grams of fresh cyclohexane to the soil remaining in the flask. No further surfactant was added to the mixture in this stage. The mixture was heated, agitated, allowed to settle, and the solvent decanted. In all stages of the extraction, the temperature of the mixture was maintained at 80° C. PCBs were measured in each liquid sample after each extraction stage. PCBs remaining in the soil after each stage of extraction were calculated using simple material balance relationships. Results are shown below.

| Extraction Stage | Surfactant Weight % | PCBs Remaining in Soil PPM |
|---|---|---|
| 0 | — | 313 |
| 1 | 1 | 55 |
| 2 | 0 | 13 |
| 3 | 0 | 2.5 |
| 4 | 0 | 0 |

EXAMPLE II

Five grams of a PCB-contaminated soil sample was placed in a small screw cap vial. The soil contained about 15 wt% water. Ten grams of cyclopentane containing about 1.0 wt% (based on the weight of the soil) of the anionic surfactant in Example I, "TRITON QS-44" was added to the soil. A heating mantle was used to maintain the extraction temperature at about 45° C. Once the temperature had reached the desired point, the extraction vial was agitated using a vortex mixer for 2 minutes. At the end of the agitation period, the extraction vial was placed back in the heating mantle to recover the heat lost during the agitation period. The total heating and agitation time was about 15 minutes. At the end of this time, the sample was allowed to cool and settle and the cyclopentane was pipetted out of the extraction vial. A sample of the liquid was obtained for PCB analysis. Four additional stages of extraction similar to the first stage were conducted, however, no further surfactant was added in these stages. After each stage of extraction, a liquid sample was analyzed for PCBs. Results are shown below:

| Extraction Stage | Surfactant Weight % | PCBs Remaining in Soil PPM |
|---|---|---|
| 0 | — | 1808 |
| 1 | 1 | 384 |
| 2 | 0 | 157 |
| 3 | 0 | 90 |
| 4 | 0 | 58 |
| 5 | 0 | 33 |

EXAMPLE III

A 5.5 gram of PCB-contaminated soil containing about 15 wt% water was placed in a 20 ml screw-cap vial. Hexane in the amount of 10 gram, containing 1 wt% (based on soil weight) of a cationic quaternary ammonium surfactant of the general formula set forth hereinabove, under cationic surfactants, and having an average molecular weight of 2500, sold by Whitco Chemical under the tradename "EMCOL CC-42" was added to the soil. The vial was placed in a heating bath where the temperature of the bath was maintained at 40° C. Once the desired temperature was reached, the vial was removed from the temperature bath and was agitated using a vortex mixer for 2 minutes. After the mixing was completed, the vial was placed back in the heating bath. This procedure was repeated a few times. The overall heating and mixing times for each stage of extraction was 15 minutes. At the end of each extraction cycle, the slurry was allowed to settle for about 5 minutes and the liquid phase was pipetted out of the vial and a sample was analyzed for PCBs.

The extraction procedure was repeated four more times by adding fresh solvent, but with no further surfactant, to the soil remaining in the vial and heating, stirring, allowing the solvent to settle, and decanting the solvent. After each stage of extraction, a sample was analyzed for PCBs. Results are shown below:

| Extraction Stage | Surfactant Weight % | PCBs Remaining in Soil PPM |
|---|---|---|
| 1 | — | 480 |
| 1 | 1 | 135 |
| 2 | 0 | 65 |
| 3 | 0 | 40 |
| 4 | 0 | 28 |
| 5 | 0 | 21 |

EXAMPLE IV

Experiment IV was similar to Experiment III except that the extraction was conducted at 60° C. instead of 40° C. Results are shown below:

| Extraction Stage | Surfactant Weight % | PCBs Remaining in Soil PPM |
|---|---|---|
| 0 | — | 557 |
| 1 | 1 | 136 |
| 2 | 0 | 39 |
| 3 | 0 | 12 |
| 4 | 0 | 3 |

This example illustrates the advantage of increased temperature as to the extractive efficiency of the surfactant.

These examples also illustrate water soluble comminuting surfactants which requires only one addition of the surfactant to be effective in extracting the PCBs.

EXAMPLE V

In this example, 40 grams of PCB-contaminated soil containing 25 wt% water was placed in a narrow neck flask. To this sample, 80 grams of hexane was added. No surfactant was used in this experiment. A heating mantle was used to maintain the extraction temperature at about 60° C. The heating and agitation cycles used were similar to those in Example II. The initial soil contained about 1856 ppm PCBs. After 6 stages of extraction, 987 ppm PCBs still remained in the soil. Results are shown below:

| Extraction Stage | Surfactant Weight % | PCBs Remaining in Soil PPM |
|---|---|---|
| 0 | — | 1856 |
| 1 | 0 | 1589 |
| 2 | 0 | 1317 |
| 3 | 0 | 1208 |
| 4 | 0 | 1126 |
| 5 | 0 | 1061 |
| 6 | 0 | 987 |

EXAMPLE VI

A 100-gram PCB-contaminated sludge sample containing about 75 wt% water and 25 wt% solids was placed in a 2000 ml three-neck glass flask assembled as set forth in Example I. One wt% of a catronic surfactant as used in Example II ("EMCOL CC-42"), was added to the sludge. Hexane in the amount of 200 grams was added to the glass flask. The flask was sealed from the atmosphere and placed in a heating mantle for temperature control.

The contents of the flask were stirred vigorously for five minutes while maintaining a temperature of 68 C. in the extraction mixture. At the end of the mixing period, the heat source was removed and the contents of the flask were allowed to settle for 5 minutes after which the hexane phase carrying the PCBs was decanted from the solid phase. A sample of the liquid was obtained to measure PCB removal in the first stage of extraction.

The extraction procedure was repeated by added 200 grams of fresh hexane and 0.25 wt% EMCOL CC-42" to the soil remaining in the flask. Results are shown below:

| Extraction Stage | Surfactant weight % | PCBs Remaining in Sludge ppm |
|---|---|---|
| 0 | — | 953 |
| 1 | 1 | 389 |
| 2 | 0.25 | 135 |
| 3 | 0.25 | 57 |
| 4 | 0.25 | 22 |

This example illustrates a solid containing mixture where water is not only present in small amounts but is the predominant component. This example also illustrates a partially water soluble comminuting surfactant. Since the surfactant is soluble in the hydrocarbon phase, it is removed in the solvent, contaminant/PCB phase after each extraction stage and is replenished by addition of surfactant in the subsequent stages. However, the amount of surfactant required in those stages is much smaller.

EXAMPLE VII

A 200-gram sample of a PCB-contaminated sludge was placed in a large glass test tube. The test tube containing the sludge was put into a centrifuge set at 6000 rpm for ten minutes. Approximately 100 grams of water were separated from the sludge in this manner. The resulting 100 gram solid containing mixture contained about 50 wt% water.

A 90 gram sample of the centrifuged PCB-contaminated mixture was extracted under similar conditions and following the same procedure as described in Example VI. Results are shown below:

| Extraction Stage | Surfactant Weight % | PCBs Remaining in Sludge ppm |
|---|---|---|
| 0 | — | 799 |
| 1 | 1 | 392 |
| 2 | 0.25 | 197 |
| 3 | 0.25 | 104 |
| 4 | 0.25 | 42 |

This example illustrates that the removal of water as a pretreatment will reduce the amount of surfactant used since the water is removed and the amount of surfactant is approximately half that used in Example VI.

EXAMPLE VIII

A 6.7 gram sample of PCB-contaminated soil containing about 30 wt% water was placed in a 20 ml screw-cap vial and contacted with 10 grams of hexane using a vortex mixer. Five stages of extraction were conducted at 25 C. In each stage, 1 wt% "HYONIC NP-40", a nonionic surfactant manufactured by Henkel Corporation containing 4 moles of ethylene oxide and having a hydrophilc-lypophlic balance (HLB) of 9, a density of 8.5 lb/gal, a pour point of −15 F. and a pH (1% aqueous solution) of 7.0, was added to the 10 grams of hexane. Results are shown below:

| Extraction Stage | Surfactant Weight % | PCBs Remaining in Sludge ppm |
|---|---|---|
| 0 | — | 517 |
| 1 | 1 | 285 |
| 2 | 1 | 191 |
| 3 | 1 | 150 |
| 4 | 1 | 102 |
| 5 | 1 | 88 |

This example illustrates a surfactant which is insoluble in water. Each stage has an addition of the surfactant.

This example and Example VI and VII above illustrate that the amount of surfactant which will be used in the process of the present invention depends on the amount of water present and the water solubility of the surfactant. A preferred comminuting surfactant is water soluble since it will not be removed in the solvent phase during each stage of extraction.

EXAMPLE IX

A 30 gram sample of PCB-contaminated soil was placed in a 500 ml long-neck flask. Three and one half grams of water with a pH of 10 was added to the soil to adjust its pH to approximately 9. The addition of this water increased the water content in the soil to about 15 wt%. Cyclopentane in the amount of 67 grams and containing 2.5 wt% of "Triton QS-44" anionic surfactant was added to the soil. The flask was placed on a heating mantle to increase the extraction temperature to about 45 C. Once the desired temperature had been reached, the flask was removed from the mantle and agitated using a vortex mixer for about 1 minute. At that time the flask was placed back on the heating mantle to reheat the contents. The total heating and agitation time was about 5 minutes. At the end of this period, the sample was allowed to cool and settle for another 5 minutes. The cyclopentane was then decanted off the soil and a sample was taken for PCB analysis. Four additional stages of extraction similar to the first stage were conducted; however, no further surfactant was added in these stages. After each stage of extraction, a liquid sample was analyzed for PCBs. Results are shown below:

| Extraction Stage | Surfactant Weight % | PCBs Remaining in Sludge ppm |
|---|---|---|
| 0 | — | 1497 |
| 1 | 2.5 | 1335 |
| 2 | — | 1149 |
| 3 | — | 948 |
| 4 | — | 708 |
| 5 | 1 | 589 |

This example illustrates how the extraction efficiency is effected by the pH of the mixture. When the pH is over 7 or basic, the efficiency is greatly reduced.

EXAMPLE X

A 16 gram PCB-contaminated soil sample was placed in a 500 ml long-neck flask. About 2 grams of water with a pH of 4 was added to the soil to adjust the pH of the mixture to approximately 4.5. This addition of water increased the soil water content to about 15 wt%. Five stages of extraction were conducted under the similar conditions as set forth in Example IX and following the same procedure as described in the previous example. Results are shown below:

| Extraction Stage | Surfactant Weight % | PCBs Remaining in Sludge ppm |
|---|---|---|
| 0 | — | 1620 |
| 1 | 2.5 | 315 |
| 2 | — | 122 |
| 3 | — | 82 |
| 4 | — | 57 |
| 5 | 1 | 27 |

This example illustrates that when the pH of the mixture treated by the process of the present invention is acidic or has a pH less than 7 that the extraction effeciency is greatly enhanced.

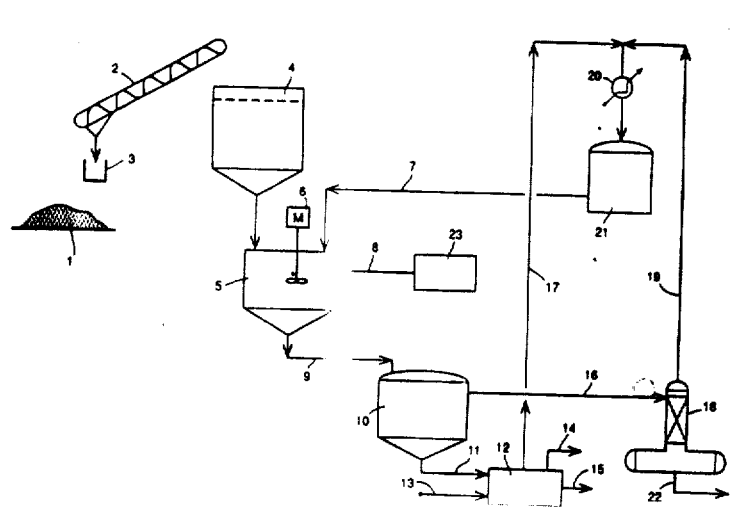

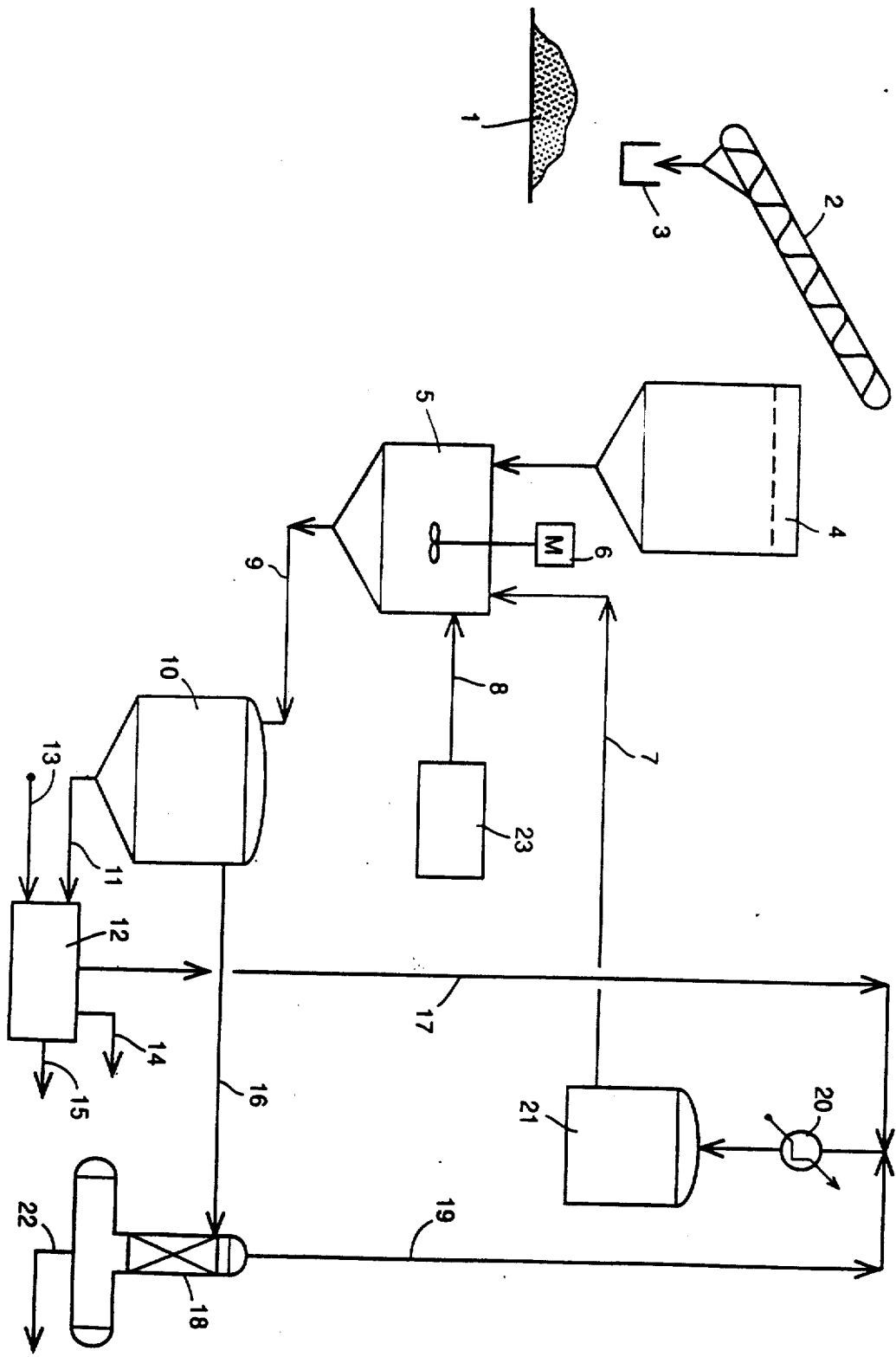

I claim:

1. A process for treating a solids-mixture comprising water, solids and a contaminant, said process comprising:
    (1) contacting said solids-mixture with a solvent for said contaminant, said solvent being sparingly soluble in water, in the presence of a comminuting and dispersing surfactant to produce a solids/liquids mixture comprising a liquids phase and a solids phase, whereby a significant portion of contaminant in said solids-mixture is extracted into the liquids phase of said solids/liquids mixture and the solids phase and the liquids phase of said solids/liquids mixture are readily separable.
2. The process of claim 1, wherein said solids-mixture is a soil.
3. The process of claim 1, wherein said solids-mixture is a sludge.
4. The process of claim 1, wherein said solids-mixture contains at least 1 wt.% water.
5. The process of claim 1, wherein said process comprises physically removing physically separable water from said solids mixture prior to said contacting in step (1).
6. The process of claim 1, wherein said contaminant comprises an organic contaminant or a mixture of organic contaminants.
7. The process of claim 6, wherein said organic contaminant or mixture of organic contaminants comprises an aromatic hydrocarbon, an aliphatic hydrocarbon or a mixture thereof.
8. The process of claim 7, wherein said aromatic hydrocarbon is at least one of PCB, benzene, toluene and anthracene.
9. The process of claim 7, wherein said aliphatic hydrocarbon is at least one of trichloroethylene and acetone.
10. The process of claim 7, wherein said aromatic hydrocarbon is PCB.
11. The process of claim 1, wherein said contaminant is a metal salt.
12. The process of claim 1, wherein said solids-mixture comprises solids in an amount of 10 to 20 wt.% of said solids-mixture.
13. The process of claim 12, wherein said hydrophobic solvent is a hydrocarbon solvent.
14. The process of claim 13, wherein said hydrocarbon compound solvent is propane, butane, pentane, hexane, heptane, octane, nonane, cyclopentane or cyclohexane.
15. The process of claim 1, wherein said solvent sparingly soluble in water is a hydrophobic solvent.
16. The process of claim 15, wherein said hydrophobic solvent is a lower aliphatic or cyclic saturated hydrocarbon compound solvent.
17. The process of claim 1, wherein said comminuting surfactant is sufficiently soluble in water to cause said contaminant to be extracted from said solids-mixture into said liquids phase.
18. The process of claim 17, wherein said contacting in step (1) is at a pH of 1 to 6.
19. The process of claim 1, wherein said contacting in step (1) is at an acid pH.
20. The process of claim 19, wherein said contacting in step (1) is at a pH of less than 5.5.
21. The process of claim 1, wherein the comminuting surfactant is a nonionic surfactant.
22. The process of claim 21, wherein said nonionic surfactant is a polyethoxy octyl phenol or a polyethoxy nonyl phenol containing 1 to 6 ethylene oxide units therein.
23. The process of claim 21, wherein the nonionic surfactant has a hydrophillic/lipophilic balance of 4 to 10.
24. The process of claim 21, wherein the nonionic surfactant comprises an adduct of a fatty acid or an amine with a polyethoxy phenolic compound.
25. The process of claim 1, wherein the comminuting surfactant is an anionic surfactant.
26. The process of claim 25, wherein said anionic surfactant is octylphenoxypolyethoxyethyl phosphate.
27. The process of claim 1, wherein the comminuting surfactant is a cationic surfactant.
28. The process of claim 27, wherein the cationic surfactant is a quaternary ammonium chloride of a polypropoxy teritary amine.
29. The process of claim 1, wherein the comminuting surfactant is an amphoteric surfactant.
30. The process of claim 1, wherein said contacting in step (1) includes agitating said solids mixture.

31. The process of claim 1, wherein the contacting in step (1) comprises a countercurrent contacting of said solids-mixture with said solvent in the presence of said surfactant.

32. A process for removing a contaminant from a solids-mixture comprising water, solids and a contaminant, said process comprising:
   (1) contacting said solids-mixture with a solvent for said contaminant, said solvent being sparingly soluble in water, in the presence of a comminuting and dispersing surfactant to produce a solids/liquids mixture comprising a liquids phase and a solid phase, whereby a significant portion of contaminant in said solids-mixture is extracted into the liquids phase of said solids/liquids mixture and the solids phase and the liquids phase of said solids/liquids mixture are readily separable; and
   (2) separating the liquids phase from the solids phase of said solids/liquid mixture.

33. The process of claim 32, wherein said solids-mixture is a soil.

34. The process of claim 32, wherein said solids-mixture is a sludge.

35. The process of claim 32, wherein said solids-mixture contains at least 1 wt.% water.

36. The process of claim 32, wherein said process comprises physically removing physically separable water from said solids mixture prior to said contacting in step (1).

37. The process of claim 32, wherein said contaminant comprises an organic contaminant or a mixture of organic contaminants.

38. The process of claim 37, wherein said organic contaminant or mixture of organic contaminants comprises an aromatic hydrocarbon, an aliphatic hydrocarbon or a mixture thereof.

39. The process of claim 38, wherein said aromatic hydrocarbon is at least one of PCB, benzene, toluene and anthracene.

40. The process of claim 38, wherein said aliphatic hydrocarbon is at least one of trichloroethylene and acetone.

41. The process of claim 38, wherein said aromatic hydrocarbon is PCB.

42. The process of claim 32, wherein said contaminant is a metal salt.

43. The process of claim 32, wherein said solids-mixture comprises solids in an amount of 10 to b 20 wt.% of said solids-mixture.

44. The process of claim 32, wherein said solvent sparingly soluble in water is a hydrophobic solvent.

45. The process of claim 44, wherein said hydrophobic solvent is a hydrocarbon solvent.

46. The process of claim 46, wherein said hydrophobic solvent is a lower aliphatic or cyclic saturated hydrocarbon compound solvent.

47. The process of claim 45, wherein said hydrocarbon compound solvent is propane, butane, pentane, hexane, heptane, octane, nonane, cyclopentane or cyclohexane 48. The process of claim 32, wherein said comminuting surfactant is sufficiently soluble in water to cause said contaminant to be extracted from said solids-mixture into said liquids phase.

49. The process of claim 32, wherein said contacting in step (1) is at an acid pH.

50. The process of claim 49, wherein said contacting in step (1) is at a pH of 1 to 6.

51. The process of claim 50, wherein said contacting in step (1) is at a pH of less than 5.5.

52. The process of claim 32, wherein the comminuting surfactant is a nonionic surfactant.

53. The process of claim 52, wherein said nonionic surfactant is a polyethoxy octyl phenol or a polyethoxy nonyl phenol containing 1 to 6 ethylene oxide units therein.

54. The process of claim 52, wherein the nonionic surfactant has a hydrophuilic/lipophilic balance of 4 to 10.

55. The process of claim 52, wherein the nonionic surfactant comprises an adduct of a fatty acid or an amine with a polyethoxy phenolic compound.

56. The process of claim 32, wherein the comminuting surfactant is an anionic surfactant.

57. The process of claim 56, wherein said anionic surfactant is octylphenoxypolyethyl phosphate.

58. The process of claim 32, wherein the comminuting surfactant is a cationic surfactant.

59. The process of claim 58, wherein the cationic surfactant is a quaternary ammonium chloride of a polypropoxy tertiary amine.

60. The process of claim 32, wherein the comminuting surfactant is an amphoteric surfactant.

61. The process of claim 32, wherein said contacting in step (1) includes agitating said solids-mixture.

62. The process of claim 32, wherein the contacting in step (1) comprises a countercurrent contacting of said solids-mixture with said solvent in the presence of said surfactant.

63. The process of claim 32, wherein the contacting in step (2) is by physically separating said liquids phase from said solids phase.

64. The process of claim 63, wherein the separating in step (2) is by gravity setting, centrifuging, hydroclone setting or a combination thereof of said liquids phase from said solids phase.

65. A process for removing a contaminant from a solids-mixture comprising water, solids and a contaminant, said process comprising:
   (1) contacting said solids-mixture with a solvent for said contaminant, said solvent being sparingly soluble in water, in the presence of a comminuting and dispersing surfactant to produce a solids/liquids mixture comprising a liquids phase and a solids phase, whereby a significant portion of contaminant in said solids-mixture is extracted into the liquids phase of said solids/liquids mixture and the solids phase and the liquids phase of said solids/liquids mixture are readily separable;
   (2) separating the liquids phase from the solids phase of said solids/liquids mixture;
   (3) removing the contaminant in said liquids phase from said liquids phase; and
   (4) recycling said liquids phase obtained after said removing of said contaminant in step (3) to said contacting step (1) as at least part of said solvent of said contacting step (1).

66. The process of claim 65, wherein said solids-mixture is a soil.

67. The process of claim 65, wherein said solids-mixture is a sludge.

68. The process of claim 65, wherein said solids-mixture contains at least 1% water.

69. The process of claim 65, wherein said process comprises physically removing physically separable water from said solids mixture prior to said contacting in step (1).

70. The process of claim 65, wherein said contaminant comprises an organic contaminant or a mixture of organic contaminants.

71. The process of claim 70, wherein said organic contaminant or mixture of organic contaminants comprises an aromatic hydrocarbon, an aliphatic hydrocarbon or a mixture thereof.

72. The process of claim 71, wherein said aromatic hydrocarbon is at least one of PCB, benzene, toluene and anthracene.

73. The process of claim 71, wherein said aliphatic hydrocarbon is at least one of trichloroethylene and acetone.

74. The process of claim 71, wherein said aromatic hydrocarbon is PCB.

75. The process of claim 65, wherein said cibtanubabt us a metal salt.

76. The process of claim 65, wherein said solids-mixture comprises solids in an amount of 10 to 20 wt.% of said solids-mixture.

77. The process of claim 65, wherein said solvent sparingly soluble in water is a hydrophobic solvent.

78. The process of claim 77, wherein said hydrophobic solvent is a hydrocarbon solvent.

79. The process of claim 78, wherein said hydrophobic solvent is a lower aliphatic or cyclic saturated hydrocarbon compound solvent.

80. The process of claim 79, wherein said hydrocarbon compound solvent is propane, butane, pentane, hexane, heptane, octane, nonane, cyclopentane or cyclohexane 81. The process of claim 65, wherein said comminuting surfactant is sufficiently soluble in water to cause said contaminant to be extracted from said solids-mixture into said liquids phase.

82. The process of claim 65, wherein said contacting in step (1) is at an acid pH.

83. The process of claim 82, wherein said contacting in step (1) is at a pH of 1 to 6.

84. The process of claim 83, wherein said contacting in step (1) is at a pH of less than 5.5.

85. The process of claim 65, wherein the comminuting surfactant is a nonionic surfactant.

86. The process of claim 85, wherein said nonionic surfactant is a polyethoxy octyl phenol or a polyethoxy nonyl phenol containing 1 to 6 ethylene oxide units therein.

87. The process of claim 85, wherein the nonionic surfactant has a hydrophilic/lipophilic balance of 4 to 10.

88. The process of claim 85, wherein the nonionic surfactant comprises an adduct of a fatty acid or an amine with a polyethoxy phenolic compound.

89. The process of claim 65, wherein the comminuting surfactant is an anionic surfactant.

90. The process of claim 89, wherein said anionic surfactant is octylphenoxypolyethoxyethyl phosphate.

91. The process of claim 65, wherein the comminuting surfactant is a cationic surfactant.

92. The process of claim 51, wherein the cationic surfactant is a quaternary ammonium chloride of a polypropoxy tertiary amine.

93. The process of claim 65, wherein the comminuting surfactant is an amphoteric surfactant.

94. The process of claim 65, wherein said contacting in step (1) includes agitating said solids-mixture.

95. The process of claim 65, wherein the contacting in step (1) comprises a countercurrent contacting of said solids-mixture with said solvent in the presence of said surfactant.

96. The process of claim 65, wherein the separating in step (2) is by physically separating said liquids phase from said solids phase.

97. The process of claim 96, wherein the separating in step (2) is by gravity setting, centrifuging, hydroclone settling or a combination thereof of said liquid phase from said solids phase.

98. The process of claim 65, wherein said recovering of said solvent in step (3) is by distilling off said solvent from said liquids phase separated in step (2).

99. The process of claim 65, wherein said recycling of said liquids phase is with the addition of additional comminuting surfactant prior to or during said contacting in step (1).

100. A process for removing a contaminant from a solids-mixture comprising
 (1) contacting said solids-mixture with a solvent for said contaminant, said solvent being sparingly soluble in water, in the presence of a comminuting and dispersing surfactant to produce a solids-/liquids mixture comprising a liquids phase and a solids phase, whereby a significant portion of contaminant in said solids-mixture is extracted into the liquids phase of said solids/liquids mixture and the solids phase and the liquids phase of said solids/liquids mixture are readily separable;
 (2) separating the liquids phase from the solids phase of said solids/liquids mixture.
 (3) removing the contaminant in said liquids phase from said liquids phase;
 (4) recycling said liquids phase obtained after said removing of said contaminant in step (3) to said contacting step (1) as at least part of said solvent of said contacting step (1); and
 (5) repeating a plurality of times and contacting in step (1), said separating in step (2), said removing in step (3) and said recycling in step (4) on said solids-mixture obtained each time in said separating in step (2).

101. The process of claim 100, wherein said solids-mixture is a soil.

102. The process of claim 100, wherein said solids-mixture is a sludge.

103. The process of claim 100, wherein said solids-mixture contains at least 1 wt.% water.

104. The process of claim 100, wherein said process comprises physically removing physically separable water from said solids mixture prior to said contacting in step (1).

105. The process of claim 100, wherein said contaminant comprises an organic contaminant or a mixture of organic contaminants.

106. The process of claim 105, wherein said organic contaminant or mixture of organic contaminants comprises an aromatic hydrocarbon, an aliphatic hydrocarbon or a mixture thereof.

107. The process of claim 106, wherein said aromatic hydrocarbon is at least one of PCB, benzene, toluene and anthracene.

108. The process of claim 106, wherein said aliphatic hydrocarbon is at least one of trichloroethylene and acetone.

109. The process of claim 106, wherein said aromatic hydrocarbon is PCB.

110. The process of claim 100, wherein said contaminant is a metal salt.

111. The process of claim 100, wherein said solids-mixture comprises solids in an amount of 10 to 20 wt.% of said solids-mixture.

112. The process of claim 100, wherein said solvent sparingly soluble in water is a hydrophobic solvent.

113. The process of claim 112, wherein said hydrophobic solvent is a hydrocarbon solvent.

114. The process of claim 113, wherein said hydrophobic solvent is a lower aliphatic or cyclic saturated hydrocarbon compound solvent.

115. The process of claim 114, wherein said hydrocarbon compound solvent is propane, butane, pentane, hexane, heptane, octane, nonane, cyclopentane or cyclohexane.

116. The process of claim 100, wherein said comminuting surfactant is sufficiently soluble in water to cause said contaminant to be extracted from said solids-mixture into said liquids phase.

117. The process of claim 100, wherein said contacting in step (1) is at an acid pH.

118. The process of claim 117, wherein said contacting in step (1) is at a pH of 1 to 6.

119. The process of claim 118, wherein said contacting in step (1) is at a pH of less than 5.5.

120. The process of claim 100, wherein the comminuting surfactant is a nonionic surfactant.

121. The process of claim 120, wherein said nonionic surfactant is a polyethoxy octyl phenol or a polyethoxy nonyl phenol containing 1 to 6 ethylene oxide units therein.

122. The process of claim 120, wherein the nonionic surfactant has a hydrophillic/lipophilic balance of 4 to 10.

123. The process of claim 120, wherein the nonionic surfactant comprises an adduct of a fatty acid or an amine with a polyethoxy phenolic compound.

124. The process of claim 100, wherein the comminuting surfactant is an anionic surfactant.

125. The process of claim 124, wherein said anionic surfactant is octylphenoxypolyethoxyethyl phosphate.

126. The process of claim 100, wherein the comminuting surfactant is a cationic surfactant.

127. The process of claim 126, wherein the cationic surfactant is a quaternary ammonium chloride of a polypropoxy tertiary amine.

128. The process of claim 100, wherein the comminuting surfactant is an amphoteric surfactant.

129. The process of claim 100, wherein said contacting in step (1) includes agitating said solids-mixture.

130. The process of claim 100, wherein the contacting in step (1) comprises a countercurrent contacting of said solids-mixture with said solvent in the presence of said surfactant.

131. The process of claim 100, wherein the separating in step (2) is by physically separating said liquids phase from said solids phase.

132. The process of claim 130, wherein the separating in step (2) is by gravity setting, centrifuging, hydroclone settling or a combination thereof of said liquids phase from said solids phase.

133. The process of claim 100, wherein said recovering of said solvent in step (3) is by distilling off said solvent from said liquids phase separated in step (2).

134. The process of claim 100, wherein said recycling of said liquids phase is with the addition of additional comminuting surfactant prior to or during said contacting in step (1).

* * * * *

UNITED STATES PATENT AND TRADEMARK OFFICE
CERTIFICATE OF CORRECTION

PATENT NO. : 5,055,196

DATED : Oct. 8, 1991

INVENTOR(S) : Saeed T. Darian et al

It is certified that error appears in the above-identified patent and that said Letters Patent is hereby corrected as shown below:

The Title Page showing the illustrative figure, should be deleted to appear as per attached Title page The sheet of drawing should be deleted to appear as per attached sheet.

Col. 2, line 24, after "Land" and before "Hazardous", insert --Disposa, Remedial Action, Incineration and Treatment of --.

Col. 6. line 7, delete "communting", and insert --comminuting--.

Col. 9, delete lines 5-9 and insert --The solvent/PCB's separation is greatly enhanced by the low-boiling point of the solvent, and with a preferred solvent greater than 98% of the solvent is recovered and reused--.

Col. 16, line 18, delete "TRITON QS-44[", and insert in place, --"TRITON QS-44"--.

Col. 18, line 13, after "tank" delete "21", and insert in place, --21--.

Col. 25, line 48, claim 43, delete the phrase, "10to b 20 wt%" and insert in place, --10 to 20 wt%--.

Col. 25, line 54, claim 46. Delete "46" and insert --45--.

Col. 25, line 57, claim 47. Delete "45" and insert --46--.

UNITED STATES PATENT AND TRADEMARK OFFICE
CERTIFICATE OF CORRECTION

PATENT NO. : 5,055,196  Page 2 of 4
DATED : Oct. 8, 1991
INVENTOR(S) : Saeed T. Darian et al It is certified that error appears in the above-identified patent and that said Letters Patent is hereby corrected as shown below:

Col. 26, line 10, claim 54, delete "hydrophuilic" and insert in place, --hydrophilic--.

Col. 26, line 18, claim 57, delete, "octylphenoxpolyethyl", and insert in place, --octylphenoxypolyethoxyethyl--.

Col. 27, line 62, claim 92. Delete "51" and insert --91--.

Col. 30, line 24, claim 132. Delete "130" and insert --131--.

Signed and Sealed this

Thirty-first Day of March, 1992

Attest:

HARRY F. MANBECK, JR.

*Attesting Officer*    *Commissioner of Patents and Trademarks*

United States Patent [19]

Darian et al.

[11] Patent Number: 5,055,196
[45] Date of Patent: Oct. 8, 1991

[54] EXTRACTION PROCESS TO REMOVE PCBS FROM SOIL AND SLUDGE

[75] Inventors: Saeed T. Darian; Stephen P. Weinberg, both of Houston, Tex.

[73] Assignee: ENSR Corporation, Houston, Tex.

[21] Appl. No.: 289,219

[22] Filed: Dec. 22, 1988

[51] Int. Cl.$^5$ .......................................... B01D 11/02
[52] U.S. Cl. ........................ 210/638; 134/25.1; 134/26; 134/40; 208/262.1; 208/262.5; 210/639; 210/805; 210/806; 210/909
[58] Field of Search ................. 134/7, 12, 25.1; 210/172, 195.1, 198.1, 200, 201, 202, 205, 206, 5.11, 634, 691, 699, 907, 908, 909; 585/469; 208/262.1, 262.5, 390, 391, 435

[56] References Cited

U.S. PATENT DOCUMENTS

| 4,336,136 | 6/1982 | Giguere | 210/195.1 |
|---|---|---|---|
| 4,374,735 | 2/1983 | Lindorfer et al. | 210/925 |
| 4,424,081 | 1/1984 | Giguere | 134/25.1 |
| 4,430,208 | 2/1984 | Pytlewski | 208/262.5 |
| 4,589,985 | 5/1986 | Yorke | 210/699 |
| 4,599,117 | 7/1986 | Luxemburg | 134/25.1 |
| 4,606,774 | 8/1986 | Morris | 134/12 |
| 4,610,729 | 9/1986 | Keane | 134/26 |
| 4,662,990 | 5/1987 | Bonanno | 210/195.1 |
| 4,726,905 | 2/1988 | Friedman et al. | 210/909 |
| 4,783,263 | 11/1988 | Trost et al. | 134/25.1 |
| 4,792,413 | 12/1988 | Nash et al. | 252/111 |
| 4,801,384 | 1/1989 | Steiner | 210/634 |
| 4,841,998 | 6/1989 | Bruya | 134/25.1 |
| 4,844,745 | 7/1989 | Nash et al. | 210/909 |
| 4,869,825 | 9/1989 | Steiner | 26/634 |
| 4,952,315 | 8/1990 | Saab | 134/25.1 |

FOREIGN PATENT DOCUMENTS

| 1145284 | 4/1983 | Canada | 208/391 |
|---|---|---|---|
| 2901927 | 7/1979 | Fed. Rep. of Germany | 134/40 |
| 0162454 | 9/1984 | Japan | 210/634 |
| 8602434 | 4/1986 | PCT Int'l Appl. | 134/12 |
| 1457608 | 12/1976 | United Kingdom | 210/634 |
| 1458633 | 12/1976 | United Kingdom | 210/634 |
| 2049466 | 12/1980 | United Kingdom | 210/634 |

OTHER PUBLICATIONS

Article by Sarbarethal, "Tarsands Extracts with Microemulsions and Emulsions", The Canadian Journal of Chemical Engineering, vol. 62, Apr. 1984.

John M. Moses, Ramin A. Brishamian; Use of Liquefied Gas Solvent Extraction in Hazardous Waste Site Closures; Aug. 1988; unpublished; Aiche 1988 Summer National Meeting, Denver, Colo., Aug. 21-24; paper #55D.

Ben M. Carpenter; PCB Sediment Decontamination-Technical/Economic Assessment of Selected Alternative Treatments, Dec. 1986; pp. 54-120; Hazardous Waste Engineering Research and Development, U.S. Environmental Protection Agency, Cincinnati, Ohio, 45268.

(List continued on next page.)

Primary Examiner—Robert A. Dawson
Assistant Examiner—Joseph Drodge
Attorney, Agent, or Firm—Felfe & Lynch

[57] ABSTRACT

This invention relates to a process for treating soil and sludge for removal of contaminants in contact with the soil or sludge. More particularly, this invention relates to a process where contaminants such as inorganic contaminants such as metal or metal salts or organic contaminants such as PCBs are removed from water-wet soil and sludge. In particular, this invention relates to a process for treating or cleaning a contaminated water-wet solid containing mixture by contacting the contaminated water-wet mixture with a solvent, the solvent containing a comminuting surfactant. The solvent used is a solvent for the contaminant and is sparingly soluble in water. The purpose of adding a comminuting surfactant to the solvent is to form a dispersed mixture of the solids, contaminants, and water whereby the contaminants are extractable into the solvent. The solvent containing the contaminants is easily separated from the solids and then the solvents and contaminants are separated and the solvent is reused. The solvent is preferably a hydrocarbon solvent containing a comminuting surfactant.

134 Claims, 1 Drawing Sheet